United States Patent
Chen et al.

(10) Patent No.: US 9,734,796 B2
(45) Date of Patent: *Aug. 15, 2017

(54) REDUCING ENERGY CONSUMPTION OF A DISPLAY

(71) Applicant: International Business Machines Corporation, Armonk, NY (US)

(72) Inventors: Jing Chen, Shanghai (CN); Fang Lu, Shanghai (CN); Juan Rao, Shanghai (CN); Xue Ting Ying, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,163

(22) Filed: Mar. 1, 2016

(65) Prior Publication Data

US 2017/0116958 A1 Apr. 27, 2017

Related U.S. Application Data

(63) Continuation of application No. 14/922,242, filed on Oct. 26, 2015.

(51) Int. Cl.
*G09G 5/10* (2006.01)
*G06T 3/40* (2006.01)
*G09G 3/16* (2006.01)

(52) U.S. Cl.
CPC .............. *G09G 5/10* (2013.01); *G06T 3/40* (2013.01); *G09G 2320/0626* (2013.01); *G09G 2330/021* (2013.01)

(58) Field of Classification Search
CPC combination set(s) only.
See application file for complete search history.

(56) References Cited

U.S. PATENT DOCUMENTS

| | | | |
|---|---|---|---|
| 8,687,840 B2 | 4/2014 | Samanta Singhar | |
| 8,803,868 B2 | 8/2014 | Ferren et al. | |
| 2006/0227125 A1 | 10/2006 | Wong et al. | |
| 2011/0010019 A1* | 1/2011 | Shloush | H05B 37/0218 700/295 |

(Continued)

OTHER PUBLICATIONS

IBM: List of IBM Patents or Patent Applications Treated as Related (Appendix P), Mar. 1, 2016, pp. 1-2.

(Continued)

*Primary Examiner* — Wesner Sajous
(74) *Attorney, Agent, or Firm* — Reza Sarbakhsh (57) ABSTRACT

Embodiments disclosed herein provide systems, methods, and computer program product for managing power consumption of a display. An illumination area of the display may be adjusted to limit or increase a number of activated light emitting devices, and thus, adjust power consumption of the display. A device may receive an input to adjust the first illumination area to the second illumination area. In response, a device may, for example, disable a portion of the first illumination area not included in the second illumination area. In another example, a device may enable a portion of the second illumination area not included in the first illumination area. An amount of operation time and/or energy storage may be calculated, based at least in part on a resize of an illumination area of the display.

8 Claims, 9 Drawing Sheets

(56) References Cited

U.S. PATENT DOCUMENTS

| | | | |
|---|---|---|---|
| 2012/0139885 A1* | 6/2012 | Iwasa | G09G 3/3426 345/207 |
| 2014/0092140 A1 | 4/2014 | Wadhwa et al. | |
| 2014/0160181 A1* | 6/2014 | Takeda | G09G 3/342 345/690 |
| 2014/0204016 A1 | 7/2014 | Plowman | |
| 2014/0292829 A1* | 10/2014 | Huang | G09G 3/3406 345/690 |
| 2015/0002554 A1 | 1/2015 | Kupershmidt et al. | |
| 2015/0138831 A1* | 5/2015 | Okano | G02B 6/0021 362/609 |
| 2015/0185397 A1* | 7/2015 | Klement | G02B 6/0035 345/690 |
| 2016/0093255 A1* | 3/2016 | Aoki | G09G 3/3426 345/690 |
| 2016/0268543 A1* | 9/2016 | Ni | B05D 3/06 |

OTHER PUBLICATIONS

Pending U.S. Appl. No. 14/922,242, filed Oct. 26, 2015, titled Reducing Energy Consumption of a Display, pp. 1-50.

Disclosed Anonymously, "A Smart Method to Save Powe on Mobile Devices", IP.com No. 000232572, Nov. 18, 2013, pp. 1-3.

Pending U.S. Appl. No. 14/922,242, filed Oct. 26, 2015, titled "Reducing Energy Consumption of a Display," pp. 1-50.

* cited by examiner

REDUCING ENERGY CONSUMPTION OF A DISPLAY

BACKGROUND

Embodiments of the present invention relate generally to mobile devices, and more particularly to a structure and method of reducing energy consumption of a display.

A display of a device, such as a smart phone, may typically use approximately 30% -60% of the total power consumption. Sometimes a display may consume up to more than 80% of the total power consumption if a user frequently leaves a display illuminated. Therefore, a screen display is critical to conserving power available from a mobile device's battery. Typically, a user can lower the brightness of the display in order to use less battery power. Even though lowering a brightness of a display can extend the battery life of an electronic device, lowering the brightness may not extend the battery life as long as a user desires and may make reading difficult when a user is in a bright environment. Thus, a method to reduce energy consumption from a display without requiring a reduction in brightness is needed.

SUMMARY

According to an embodiment, a method of reducing energy consumption of a display. The method may include enabling a first illumination area of a display. The method may include receiving instructions for resizing the first illumination area to a second illumination area. The method may include adjusting the first illumination area to a second illumination area on the display based on the instructions. The method may include performing one or more of the following: disabling a portion of the first illumination area not included in the second illumination area, and enabling a portion of the second illumination area not included in the first illumination area.

According to another embodiment, a computer program product for reducing energy consumption of a display is provided. The computer program product may include a computer readable storage medium having program instructions embodied therewith. The computer readable storage medium is not a transitory signal per se. The program instructions may be executable by a processor to cause a computer to perform a method. The method may include enabling a first illumination area of the display. A computer may receive an input for adjusting the first illumination area to the second illumination area. A computer may adjust the first illumination area to a second illumination area on the display based on the input. The computer may perform one or more of the following: disable a portion of the first illumination area not included in the second illumination area, and enable a portion of the second illumination area not included in the first illumination area.

According to another embodiment, a computing device is provided. The computing device may include a display configured to display a first illumination area and a second illumination area. The computing device may include one or more computer processors, one or more computer-readable storage media, and program instructions stored on the computer-readable storage media for execution by at least one of the one or more processors. The program instructions may include instructions to display an image on a first illumination area of the display. The program instructions may include instructions to receive an input for resizing the first illumination area. The program instructions may include instructions to resize the first illumination area to a second illumination area on the display based on the instructions. The program instructions may include instructions to perform one of the following: disabling a portion of the first illumination area not included in the second illumination area, or enabling a portion of the second illumination area not included in the first illumination area.

According to another embodiment, an electronic display device is provided. The electronic display device may include a display element. The electronic display device may include a plurality of light emitting devices configured to illuminate at least a portion of the display element. The plurality of light emitting devices may be controlled by one or more illumination control chips. The electronic display device may include a first illumination control chip controlling a first set of the plurality of light emitting devices within a first illumination area of the display element. The electronic display device may include a second illumination control chip controlling a second set of the plurality of light emitting devices within a second illumination area of the display element. The electronic display device may include one or more computer processors, one or more computer-readable storage media, and program instructions stored on the computer-readable storage media for execution by at least one of the one or more processors. The program instructions may include instructions to activate a first set of the plurality of light emitting devices, by at least one illumination control chip, to display an image on a first illumination area of the display element. The program instructions may include instructions to receive an input to adjust the first illumination area to a second illumination area. The program instructions may include instructions to perform one or more of: disabling, by at least one illumination control chip, light emitting devices in the first set not within the second illumination area; and enabling, by at least one illumination control chip, light emitting devices within the second illumination area.

BRIEF DESCRIPTION OF THE DRAWINGS

The following detailed description, given by way of example and not intended to limit the invention solely thereto, will best be appreciated in conjunction with the accompanying drawings, in which not all structures may be shown.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of structures and methods are disclosed herein; however, it can be understood that the disclosed embodiments are merely illustrative of structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art.

In the following description, numerous specific details are set forth, such as particular structures, components, materials, dimensions, processing steps, and techniques, in order to provide a thorough understanding of the present invention. However, it will be appreciated by one of ordinary skill of the art that the invention may be practiced without these specific details. In other instances, well-known structures or processing steps have not been described in detail in order to avoid obscuring the invention. It will be understood that when an element as a layer, region, or substrate is referred to as being "on" or "over" another element, it can be directly on the other element or intervening elements may also be present. In contrast, when an element is referred to as being "directly on" or "directly" over another element, there are no intervening elements present. It will also be understood that when an element is referred to as being "beneath," "below," or "under" another element, it can be directly beneath or under the other element, or intervening elements may be present. In contrast, when an element is referred to as being "directly beneath" or "directly under" another element, there are no intervening elements present.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Many mobile devices are battery powered and, therefore, may be limited in an amount of energy stored in their batteries to operate. While other processing circuitries within a mobile device may use some of the battery power, a display for a mobile device may use a large portion of power when in operation. Other devices may have ample available power, such as plugged-in electronics, but may be consuming more energy than preferred by a user. Displays for mobile devices and other devices may use one or more technologies to generate an image. Some displays utilize non-light emitting technologies, such as liquid-crystal displays (LCDs), in which the liquid crystals are arrayed in front of a backlight to generate images on the display screen. A backlight may be a form of illumination used in liquid crystal displays (LCDs) to produce a visible image. Backlights may illuminate LCD displays from a side or back of a screen. A light guide plate (LGP) may be used in a backlight module. An LGP may be designed to refract light emitted from pre-connected LEDs. One or more LEDs may be located at an edge of an LGP and light refracted from an LGP may have a uniform brightness. An LCD display may be illuminated by LEDs and LGPs. Other displays may utilize light emitting technologies such as light emitting diodes (LEDs) with pixels that emit light on demand with semiconductor light sources. LEDs may be illuminated by the movement of electrons in a semiconductor material. Depending on a technology used in a display and/or a frequency of use, a display may typically use approximately 30%-60% of a total power consumption of a mobile device. Sometimes a display may consume up to more than 80% of a total power consumption of a mobile device if a user frequently leaves a display illuminated. Therefore, due to high energy consumption, a display is critical to conserving power. Although a user may typically be able to lower a brightness of a display to reduce power consumption, lowering the brightness may not reduce power consumption as much as a user desires and may make reading difficult when a user is in a bright environment. Thus, a method to reduce energy consumption from a display without requiring a reduction in brightness is needed.

Embodiments of the present invention may involve reducing energy consumption of a display without requiring a reduction in brightness. In particular, a size of an illumination area of a display may be controlled and portions of a display may be deactivated to reduce power consumption. Resizing an illumination area of a display may also reduce a number of applications running, thereby reducing power consumption. In an embodiment, an indication of an amount of operation time, battery indicator, and/or energy available may be calculated and/or displayed based at least in part on a dynamic resize of the display. In an embodiment, a first illumination area of a display may be resized to a second illumination area and a portion of the first illumination area may be disabled. For example, an image on an LED display may be shrunk and one or more LEDs may be disabled in a region outside of the second illumination area. By disabling one or more LEDs on the display, electric energy may be conserved without requiring a reduction in brightness of the display. In another embodiment, a first illumination area of a display may be resized to a second illumination area, a portion of the first illumination area may be disabled, and a brightness of the second illumination area may be reduced. For example, an image on an LED display may be shrunk, one or more LEDs may be disabled in a region outside of the first illumination area, and a brightness of one or more LEDs within the second illumination area may be reduced. By disabling one or more LEDs on the display and reducing a brightness of one or more LEDs on the display, electrical energy may be conserved significantly more than energy conservation from conventional methods.

Overall, embodiments of the invention may provide a new method to save power on a mobile device by adjusting an illumination area of a display. Embodiments of the present invention enable a user to reduce a size of an illumination area of a display. Other embodiments of the present invention may enable a computer to reduce a size of an illumination area of a display when an event occurs, such as, for example, energy storage falling below a threshold level. Since display illumination may consume a substantial amount of power, reducing a size of an illumination area of a display may substantially reduce power consumption of a device.

Embodiments of the invention may involve a structure, method, system, and/or computer program product. For example, a structure may include a plurality of LED lights deploying multiple AAT3124 chips to control one or more LED lights for lightening. Note that the numbers, LED layout, and zoom-out sizes may vary to meet different business and/or user needs. LEDs may be grouped as needed, and each group may illuminate its pre-connected LGP to control an illumination area. In another embodiment, an operating system event may be triggered when an input is received on a power save button on a screen. For example, an algorithm may determine a selected illumination area based on a user input and generate an appearance of a screen zoom in/out under a power saving mode. General purpose input/output (GPIO) flags may be set and signaled to one or more LED control chips to illuminate a selected area and deactivate one or more LEDs outside of a selected area.

Figure 1:
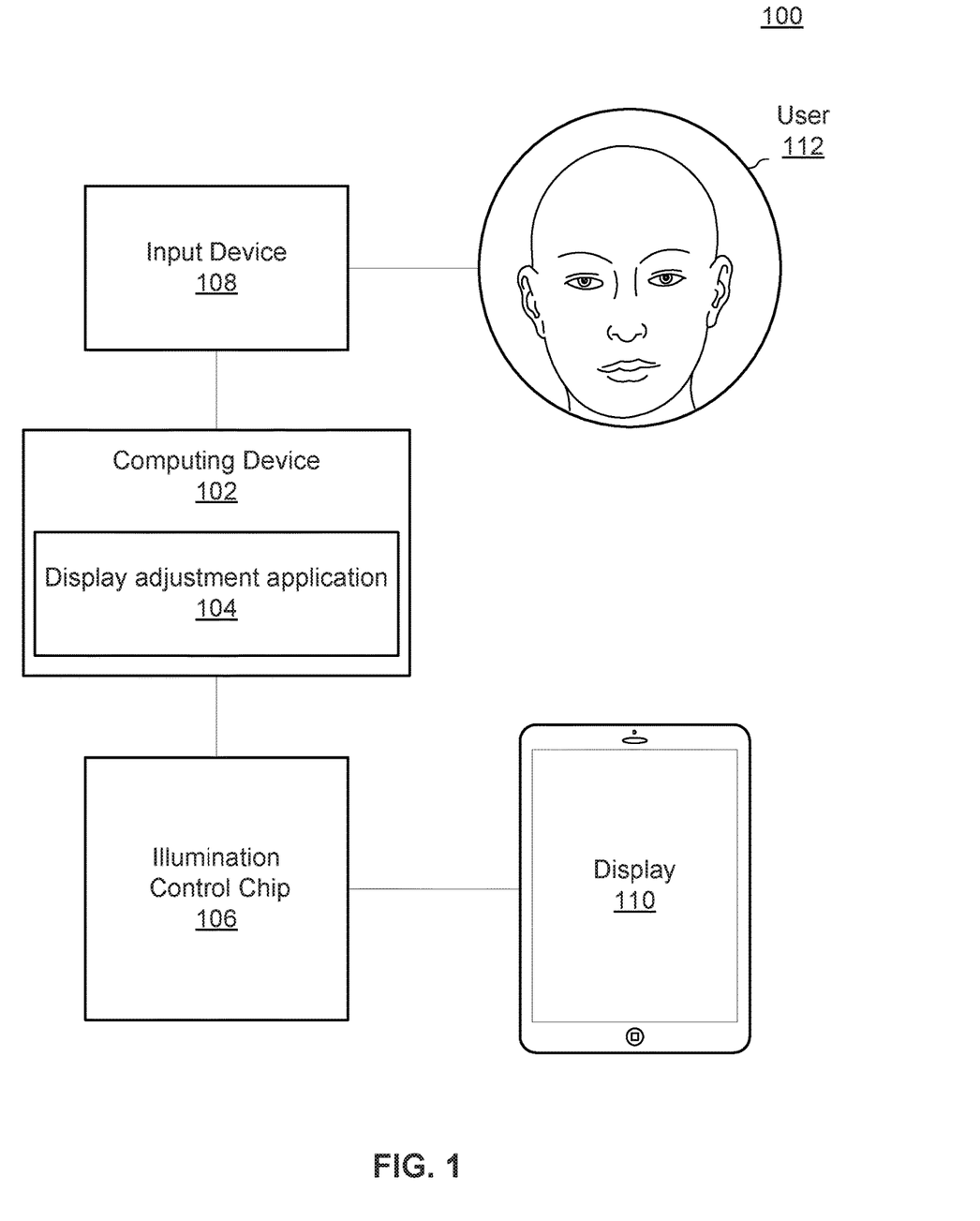
FIG. 1 is a functional block diagram illustrating reducing energy consumption of a display, in accordance with an embodiment of the present invention.

Referring now to FIG. 1, a functional block diagram illustrating a screen adjustment system 100 is shown, according to an embodiment of the present invention. In an embodiment, screen adjustment system 100 may include computing device 102, display 110, illumination control chip 106, and input device 108. Screen adjustment system 100 may further include one or more output devices, an input device 108, or any other hardware-computing element—including combinations thereof.

Figure 4A:
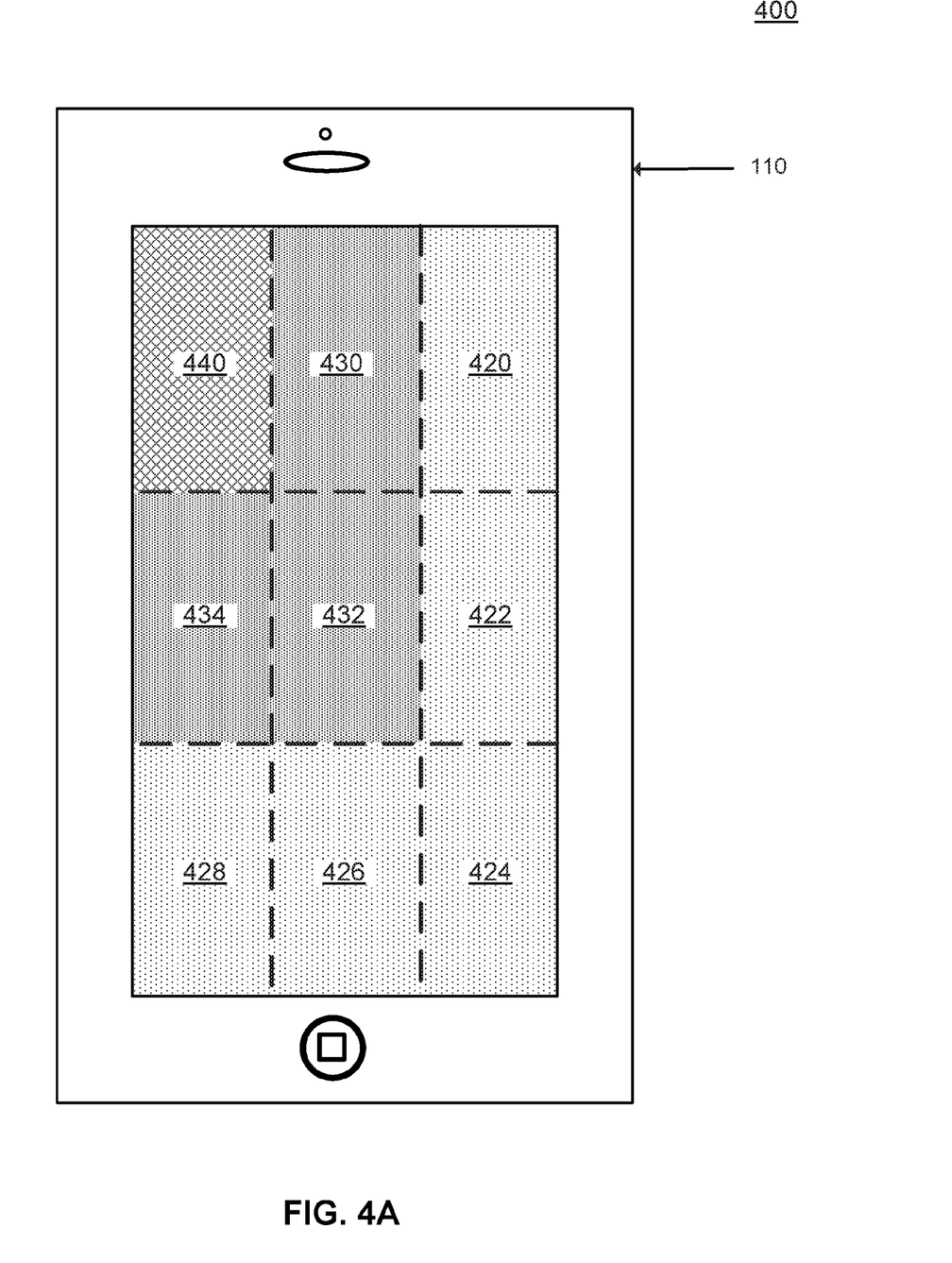
FIGS. 4A-4B are illumination area control systems, in accordance with an embodiment of the present invention.

Computing device 102 may include hardware processing circuitry for executing software instructions and memory for storing those software instructions. Computing device 102 may be a laptop computer, tablet computer, e-book reader, television, personal computer (PC), telephone, or any programmable electronic device. Computing device 102 may include internal and external hardware components, as depicted and described in further detail with respect to FIG. 4. The computing device 102 may include a display adjustment application 104. The display adjustment application 104 may be a program, function, or module of a computer program executable by a processor of the computing device 102 or may be embodied as one or more connected computing systems. The display adjustment application 104 may be implemented using a computing node such as the cloud computing node of FIG. 4. Computing device 102 and display 110 may be on a same or different device. For example, the computing device 102 and the computing device 102 may be a cloud computing device without the display 110. In another example, computing device 102 and display 110 may both be included in a laptop computer, tablet computer, e-book reader, television, personal computer (PC), telephone, or any programmable electronic device with a display.

Illumination control chip 106 may be a hardware component used to control one or more lights. For example, illumination control chip 106 may be a fractional charge pump, as described with reference to FIG. 3. Illumination control chip 106 may perform one or more functions, such as, for example, control a current and/or voltage to one or more lights. In an embodiment, at least one illumination control chip 106 may be used to control each illumination area, as described with reference to FIG. 4.

Input device 108 may be any device capable of receiving information from a user 112 or a computer (e.g. computing device 102). For example, input device 108 may be a touch screen, microphone, camera, button, keyboard, mouse, switch, or any combination thereof. In an embodiment, the input device 108 may receive an input from the user 112 directing the computing device 102 to adjust an illumination area on the display 110. For example, the user 112 may select a power save button and swipe a touchscreen to reduce a size of an illumination area. In another embodiment, the input device 108 may receive an input from a computing device directing the computing device 102 to adjust an illumination area on the display 110. For example, the display adjustment application 104 may determine that energy storage will be exhausted before a task may be performed and reduce a size of an illumination area to increase an available operating time before exhausting energy storage.

Display 110 may be any device capable of displaying one or more images on an electronic screen. For example, display 110 may include a liquid crystal display (LCD), light emitting diode (LED), organic LED (OLED), plasma, another type of display technology, or any combination of display technologies. Display 110 may include a screen with one or more illumination areas. The one or more illumination areas may occupy a region of the screen, or some portion of the screen. An illumination area may include visual information, such as, for example, a picture, text, virtual button, virtual keyboard, or other images. A size of an illumination area may be adjusted to conserve energy, as is discussed below with reference to FIGS. 2A-2C.

Figure 2A:
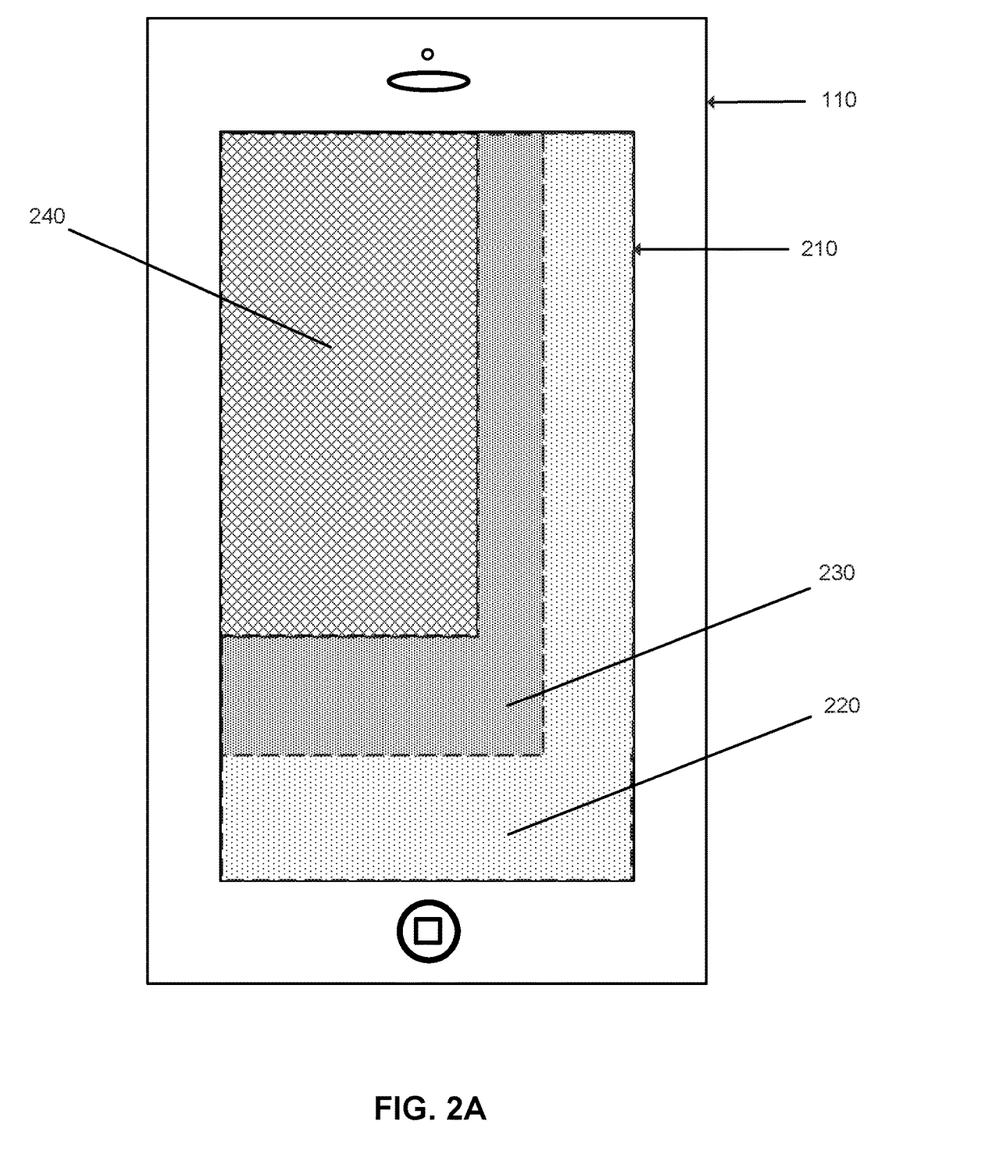
FIGS. 2A-2C are energy consumption reduction environments, in accordance with an embodiment of the present invention.
Figure 2B:
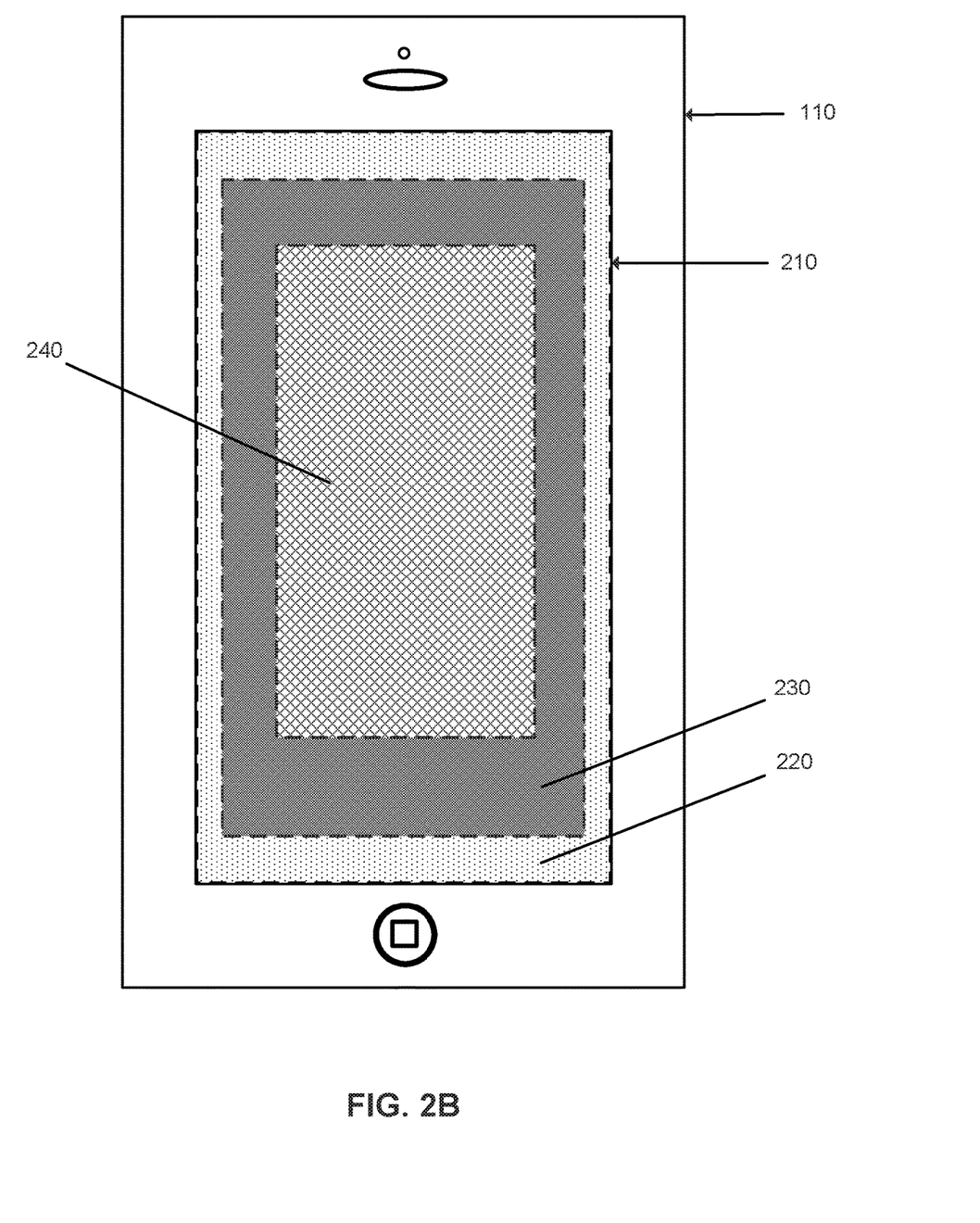
Figure 2C:
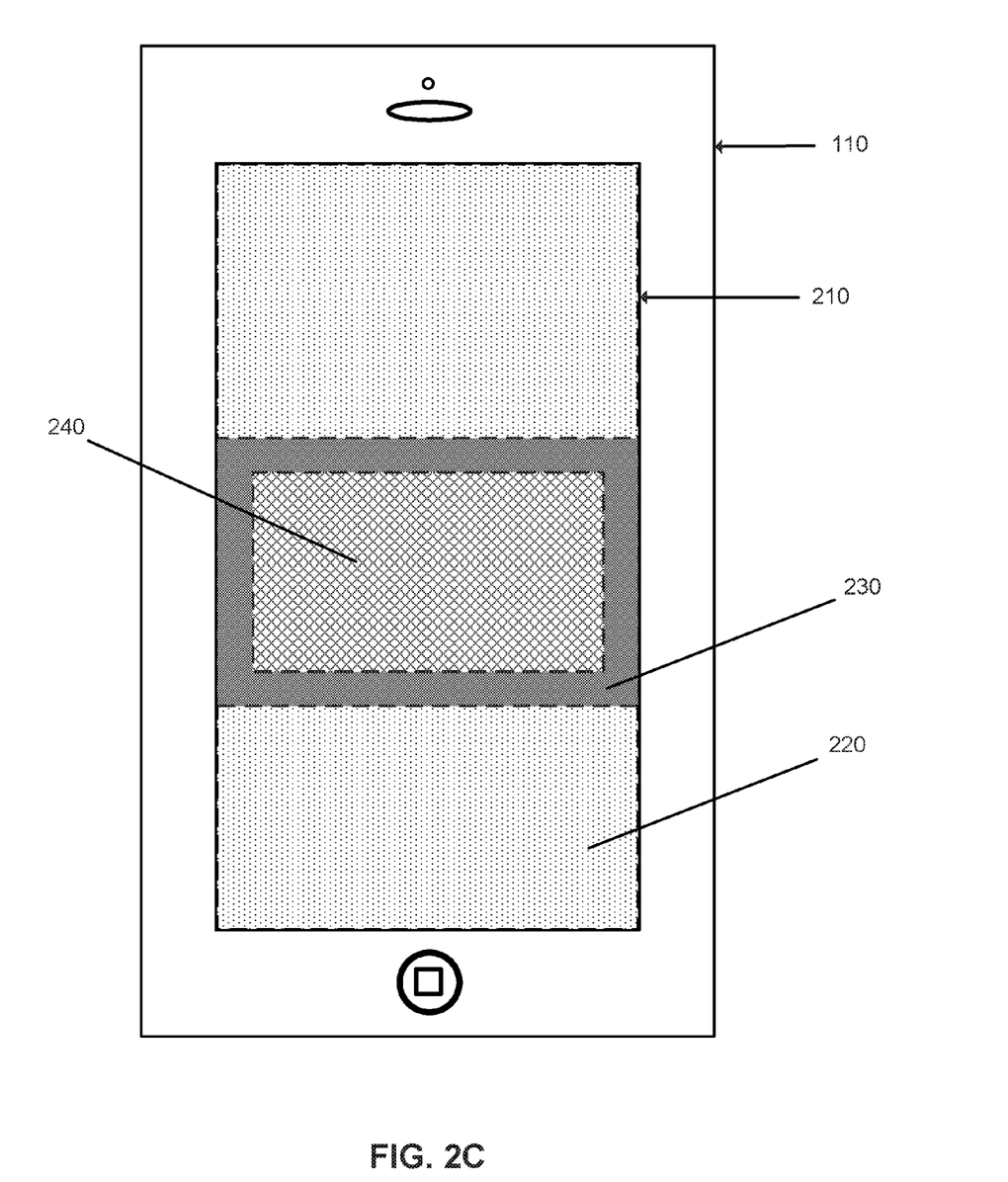

Referring now to FIG. 2A-2C, an energy consumption reduction environment is shown, according to an embodiment of the present invention. FIGS. 2A-2C illustrate an operation of computing device 102 (FIG. 1) in resizing an illumination area to conserve power. Computing device 102 may display a first illumination area 220, a second illumination area 230, and a third illumination area 240 on the display 110.

The first illumination area 220 may include the entire display 110 or a portion of the display 110. For example, the first illumination area 220 may extend to an outer boundary of a display area 210. In an example, the second illumination area 230 may include a smaller area of the display 110 than the first illumination area 220. In another example, the second illumination area 230 may include a larger area of the display 110 than the first illumination area 220. The third illumination area 240 may include a smaller or larger area of the display 110 than the second illumination area 230. The first illumination area 220, the second illumination area 230, and the third illumination area 240 are non-limiting examples of illumination areas of the display 110. In an example, the display 110 may have thousands of illumination areas with increments as small as a single pixel (e.g. an LED in an LED display). The first illumination area 220, the second illumination area 230, and the third illumination area 240 may display a graphical user interface for computing device 102, media playback, application information, or any other type of displayable information, including combinations thereof.

The computing device 102 may resize a first illumination area 220. For example, the computing device 102 may resize the first illumination area 210 in response to a user input indicating parameters to which the display should be resized. The user input may include indicating a desired illumination area size on a touch screen using a user's fingers or a stylus, entering illumination area parameters into a hardware or software keyboard, vocally indicating illumination area parameters, transmitting parameters over a communication network, using preinstalled parameters, or any other method of transmitting parameters into a computing device. In a particular example, a user may pinch the first illumination area 210 to a desired illumination area size and/or location on display 110.

In some embodiments, computing device 102 may resize the first illumination area 220 automatically upon a trigger condition. The trigger condition may include, for example, an energy level below a threshold, a change to energy saving mode, an indication by a user for a desired time of use for a device, loss of an energy supply, or any combination thereof. For example, a battery life trigger may be set in computing device 102 that triggers computing device 102 to resize the first illumination area 220 at a threshold level of battery life. The illumination area may be resized to parameters already stored in computing device 102 that were previously received from a user or elsewhere, or computing device 102 may prompt a user for resizing parameters upon activation of the trigger.

Thereafter, the computing device 110 may present a resized second illumination area 230. The second illumination area 230 may be smaller than the first illumination area 220. When the first illumination area 220 is resized, a size and location of the second illumination area 230 may be determined either from a received user input or as suggested by computing device 102. In some embodiments, display information (e.g. an image) presented in first illumination area 220 may be scaled to fit in second illumination area 230. Alternatively, display information for applications in use on computing device 102 may be reformatted to more effectively display application information in second illumination area 230. In an embodiment, one or more displayed applications may display less functionality in order to fit into second illumination area 230. For example, an application may be displayed as a standard program on a laptop computer in the first illumination area 220 and displayed as a mobile application in the second illumination area 230. A displayed application and its functionality may be selected by a user or determined by computing device 102. For example, the computing device 102 may determine that the second illumination area 230 is at or below a threshold size for a mobile application and automatically convert a standard application to its mobile equivalent. In an embodiment, execution of an application may be terminated either automatically by computing device 102 or at the request of a user. For example, when an application cannot be displayed within the second illumination area 230, the computing device 102 may close the application.

In another alternative, second illumination area 230 may display a portion of first illumination area 220. Second illumination area 230 may then be moved around display 110 by a user in order for the user to view other portions of first illumination area 220. In further embodiments, first illumination area 220 may display a larger format version of an application, such as a tablet computer version, and then second illumination area 230 may display a smaller format version of the same application, such as a smartphone version. In those embodiments, the size of illumination areas 220 and 230 may be determined based on resolution requirements of the two different application formats.

In yet another example, computing device 102 may display selected applications in second illumination area 230. Before or after providing parameters for second illumination area 230, the user may select one or more applications from a list of applications available/installed on computing device 102. A user may use various methods to select the one or more applications. For example, the application selection may be performed by selecting applications from a list, checking a check box associated with each application, long pressing an application and then drag and drop the selected application in second illumination area 230, or any other way that a user can indicate a selection on a computing device. In some cases, the user may predefine a set of applications that should be used when computing device 102 is operating with a reduced illumination area. Once the applications are selected, computing device 102 may automatically force closes, switches off, or otherwise end execution of any unselected applications. The selected applications may then be displayed in the second illumination area 230.

In a specific example, a user first selects second illumination area 230 and then selects essential applications like a dial/number pad application, a messaging application, and date/time application to be active and displayed in second illumination area 230. All other applications, such as email, GPS, WiFi, or Data Packets exchanges, are then force closed or prevented from further executing on computing device 102. Reducing the number of executing applications reduces the processing power required to execute those applications thereby further enhancing a remaining battery life.

Figure 3:
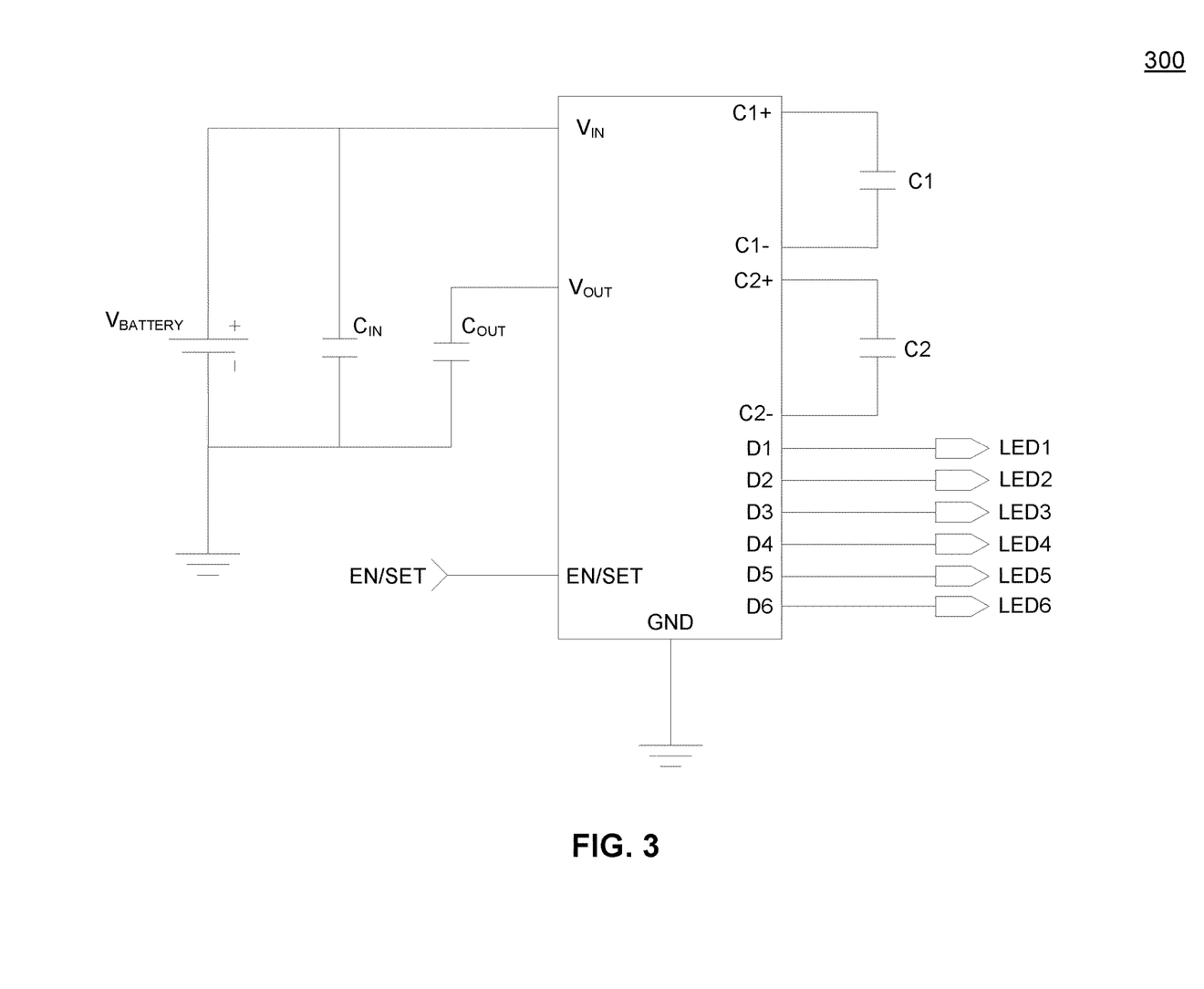
FIG. 3 is a circuit diagram of electrical components of a fractional charge pump, in accordance with an embodiment of the present invention.

Referring now to FIG. 3, a circuit diagram of electrical components of a fractional charge pump 300 is shown, according to an embodiment of the present invention. A fractional charge pump 300 or a plurality thereof may be used to control one or more illumination areas on the display 110 (FIG. 1). The fractional charge pump 300 may control an electrical current available to one or more light generating devices, such as, for example, an LED. The fractional charge pump 300 may be any fractional charge pump available in the art, such as, for example, a single chip AAT3124. The fractional charge pump 300 may be the illumination control chip 106 (FIG. 1).

Figure 4B:
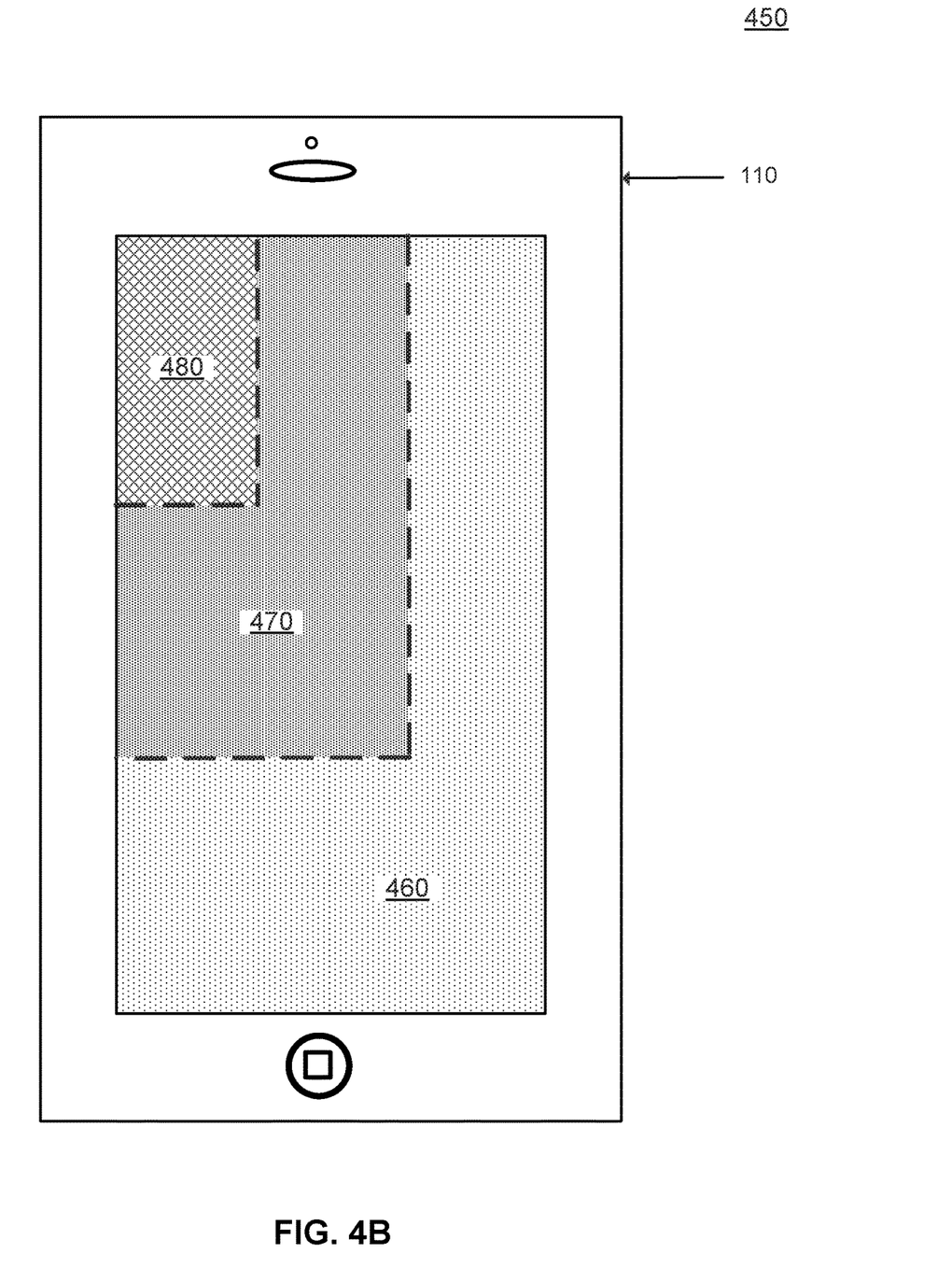

Referring now to FIGS. 4A-4B, an illumination area control system 400 and an illumination area control system 450 are shown, according to an embodiment of the present invention. In an embodiment, one or more portions of an illumination area may be controlled by one or more fractional charge pumps 300 (FIG. 3).

In liquid crystal displays (LCDs), a backlight may be used to illuminate a display. As an LCD screen may not produce light itself, backlight illumination may be needed to produce a visible image on an LCD display. Backlights may illuminate LCD displays from a side or back of an LCD screen. A light guide plate (LGP) may be used in a backlight module. An LGP may be designed to refract light emitted from a light source, such as, for example, an LED. LEDs may be placed at edges of an LGP and light refracted from an LGP may have a uniform brightness. Thus, LCD displays may be illuminated by utilizing LEDs in combination with LGPs.

In an embodiment, a display may have only one LGP that is approximately a same size as a display. For example, a cellular telephone device may have twenty LED lights placed at upper and lower edges of an LGP with only a single chip AAT3124 controlling all LED lights. When a display is operating, all twenty LED lights may be turned on to illuminate the whole screen. In another embodiment, a cellular telephone device may have ten LED lights placed at upper and lower edges of an LGP, five LED lights placed at a side of an LGP and five LED lights placed at another side of an LGP. One or more AAT3124 chips may be used to control one or more LEDs to illuminate a whole or a part of a screen.

In another embodiment, a display may include one or more LGPs and one or more fractional charge pumps 300. For example, the display 110 may include one or more LGPs for each illumination area. In another example, the display 110 may include one or more fractional charge pump 300 for each illumination area. In another example, each LGP may include one or more LEDs controlled by an independent fractional charge pump 300. By including an independent fractional charge pump 300 for each LGP, light emitted from each LGP may be controlled independently. In another example, one or more LGPs within an illumination area may share a fractional charge pump 300. By using a fractional charge pump 300 to control LEDs for one or more LGPs within an illumination area, a whole or a portion of an illumination area may be controlled by a single fractional charge pump 300.

In an embodiment illustrated in FIG. 4A, a display may include nine LGPs. Each LGP may include one or more LEDs. In an embodiment, each LED may be located behind or at a side of each LGP where each LED may only provide illumination for one LGP. The nine LGPs may be used to generate three illumination areas. LGP 420, LGP 422, LGP 424, LGP 426, LGP 428, LGP 430, LGP 432, LGP 434, and LGP 440 may be used for a first illumination area 220 (FIG. 2A). LGP 430, LGP 432, LGP 434, and LGP 440 may be used for a second illumination area 230 (FIG. 2A). LGP 440 may be used for a third illumination area 240 (FIG. 2A). In an embodiment, three fractional charge pumps 300 may be used, each controlling a set of LEDs associated with an illumination area. For example, a first AAT3124 chip may control LEDs within a first illumination area 220, a second AAT3124 chip may control LEDs within a second illumination area 230, and a third AAT3124 chip may control LEDs within a third illumination area 240.

In an embodiment illustrated in FIG. 4B, a display may include three LGPs. Each LGP may include one or more LEDs. In an embodiment, each LED may be located behind or at a side of each LGP where each LED may only provide illumination for one LGP. The three LGPs may be used to generate three illumination areas. LGP 460, LGP 470, and LGP 480 may be used for a first illumination area 220 (FIG. 2A). LGP 470 and LGP 480 may be used for the second illumination area 230 (FIG. 2A). LGP 480 may be used for the third illumination area 240 (FIG. 2A). In an embodiment, three fractional charge pumps 300 may be used, each controlling a set of LEDs associated with an illumination area. For example, a first AAT3124 chip may control LEDs within a first illumination area 220, a second AAT3124 chip may control LEDs within a second illumination area 230, and a third AAT3124 chip may control LEDs within a third illumination area 240.

Embodiments involving an LED display with various numbers of illumination control chips 106 (FIG. 1) controlling various numbers of LEDs are contemplated. In another embodiment, an LED display may have an individual LED illuminating each pixel and the illumination control chip 106 controlling each LED individually. Controlling each LED with an independent illuminated control chip 106 may offer substantial flexibility and fluidity in changing a size of an illumination area and/or moving an illumination area to another location on a display. In yet another embodiment, an LED display may have an individual LED illuminating each pixel and the illumination control chip 106 controlling a group of LEDs. For example, the illumination control chip 106 may control all or a portion of LEDs within an illumination area, such as, for example, the first illumination area 220 (FIG. 2A-C).

Please note that the foregoing are non-limiting example of an illumination area control system. Additional embodiments with various numbers of lights, illumination areas, and illumination control chips 106 are contemplated.

Figure 5:
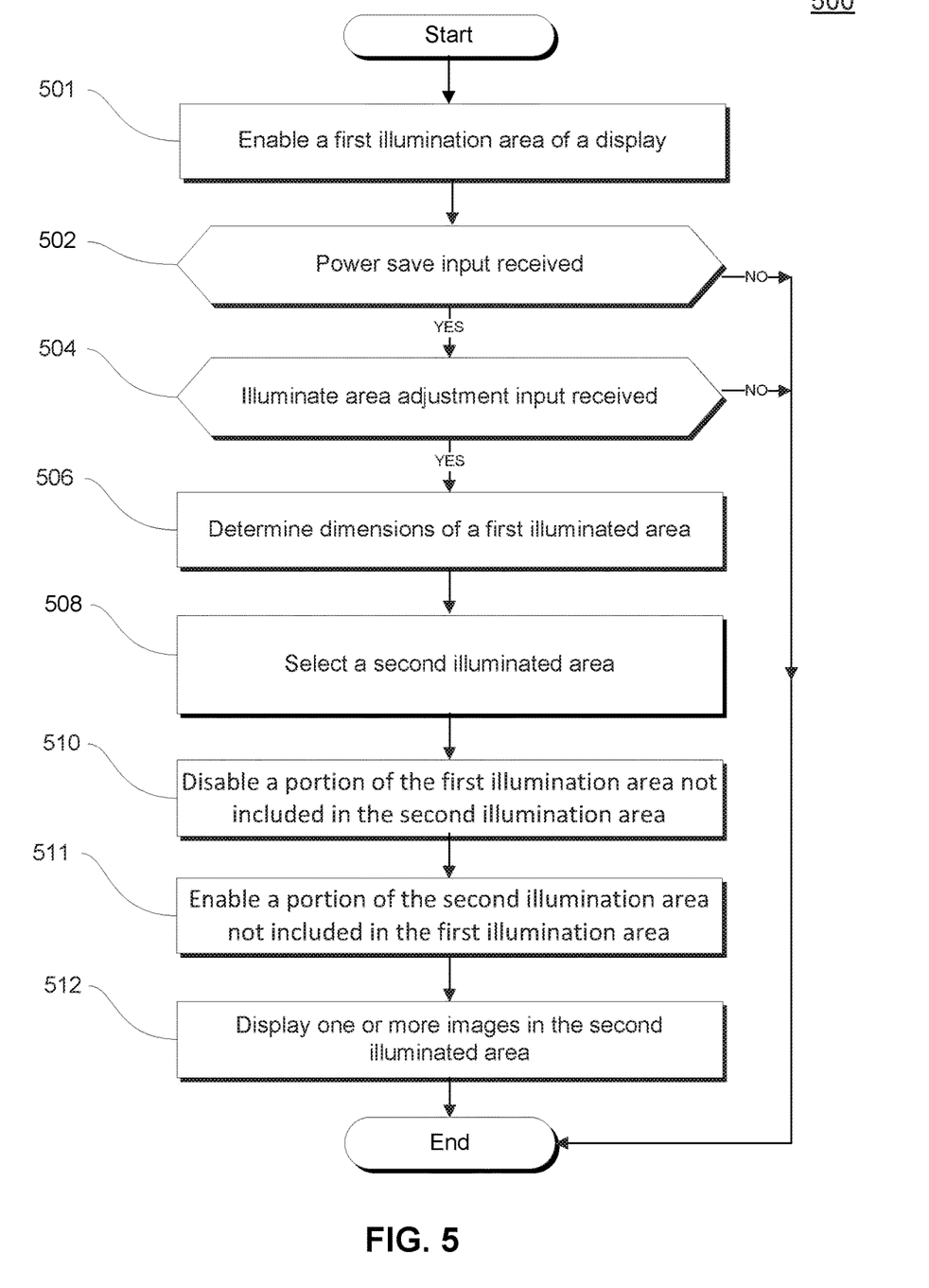
FIG. 5 is a flowchart depicting operational steps of a display adjustment application, in accordance with an embodiment of the present invention.

Referring now to FIG. 5, a flowchart of a method 500 of reducing energy consumption of a display is shown, according to an embodiment of the present invention. Steps of method 500 may be executed using a processor of a computer that encompasses, or is part of, screen adjustment system 100, or another system. In an embodiment, the method 500 of reducing energy consumption of a display may involve a step 501 of enabling a first illumination area, a decision 502 of whether a power save input is received, a decision 504 of whether an area resize input is received, a step 506 of determining dimensions of a first illumination area, a step 508 of selecting a second illumination area with nearest proportional dimensions, a step 510 of disabling a portion of the first illumination area not included in the first illumination area, a step 511 of enabling a portion of the second illumination area not included in the first illumination area, and a step 512 of displaying one or more images in a second illumination area.

The step 501 may involve enabling a first illuminated area of a display. In an embodiment, enabling a first illuminated area of a display may include transmitting an electric current to one or more light emitting devices within the first illuminated area of the display. For example, in an LED display, an electric current may be transmitted to each LED making up each pixel of the first illuminated area of the display. In another example, in an LCD display, an electric current may be transmitted to one or more groups of LEDs within one or more LGPs within the first illuminated area.

The decision 502 may involve determining whether a power save input is received. In an embodiment, a user may cause a power save input. For example, a user may touch a power save button on the display 110 (FIG. 1) which may trigger a device to enter a power saving mode. In another embodiment, a computer may cause a power save input. For example, the display adjustment application 104 may direct the computing device 102 to trigger a device to enter power saving mode when a energy storage for the display 110 drops below a threshold. A threshold may be, for example, a percentage of energy storage, a time of operation remaining without recharging, or a combination thereof. For example, the display adjustment application 104 (FIG. 1) may cause a power save input when a percentage of energy storage drops below, for example, 100%, 50%, 25%, 10%, 0.0001%, and percentages therebetween. In another example, the display adjustment application 104 may cause a power save input when a time of operating remaining without recharging drops below, for example, 3 hours, 1 hour, 30 minutes, 5 minutes, or times therebetween. In an embodiment, the power save input alone may cause the display adjustment application to change a first illumination area to a second illumination area. In another example, the display adjustment application 104 may direct the computing device 102 to cause the display 110 to change a size of an illumination area based on an energy consumption threshold. An energy consumption threshold may range vary based on a type of consuming device or a type of energy source. In another embodiment, the power save input may begin a time period for performance of an additional input which may cause the display adjustment application to change a first illumination area to a second illumination area. A time period to perform an additional input may be, for example, days, nanoseconds, and time periods therebetween. An example of an additional input a user may perform to cause the display adjustment application to change a first illumination area to a second illumination area is discussed below with reference to the decision 504.

The decision 504 may involve determining whether an area resize input is received. In an embodiment, an area resize input may only trigger a resize of an illumination area if received after a power save input and during a time period for a user to perform an additional input. For example, a user may cause a power save input and without one minute cause an area resize input which may cause a resize of an illumination area on the display 110. In another embodiment, an area resize input may trigger a resize of an illumination area without requiring an additional input. For example, a user may drag a finger across a bottom right corner of the display 110 to increase or decrease a size of an illumination area. In another example, a user may move two fingers closer or further apart from one another to increase or decrease a size of an illumination area. In another example, a user may select a button, such as, for example, "full screen" or "half screen" to increase or decrease a size of an illumination area. In another example, a user may user may say a command, such as, for example, "full screen" or "half screen" to increase or decrease a size of an illumination area. In an embodiment, a computer may provide an area resize input. For example, the display adjustment application 104 may direct the computing device 102 to cause the display 110 to change a size of an illumination area based on an energy storage capacity available to the display 110. In another example, the display adjustment application 104 may direct the computing device 102 to cause the display 110 to change a size of an illumination area based on a time of operation remaining without recharging. In another example, the display adjustment application 104 may direct the computing device 102 to cause the display 110 to change a size of an illumination area based on an energy consumption threshold.

The step 506 may involve determining dimensions of a first illumination area. In an embodiment, a computer may communicate with the display 110 to determine dimensions of a first illumination area. For example, the computing device 102 may receive dimension information from a display driver of the display 110. In another example, the computing device 102 may retrieve dimension information stored within a computer readable storage medium. Dimension information may include, for example, a size of a display, a size and/or location of an illumination area, a size and/or location of one or more application icons, a size and/or location of one or more virtual buttons, a size and/or location of one or more open applications, or any combination thereof. Dimension information of a first illumination area may be used to select a second illumination area, as is discussed below with reference to the step 508.

The step 508 may involve selecting a second illumination area with near proportional dimensions. In an embodiment, the display adjustment application 104 may select a second illumination area with near proportional dimensions. For example, a height and width of a first illumination area may be nearly or exactly proportional with a height and width of a second illumination area. In another example, a height and width of one or more applications generated in a first illumination area may be nearly or exactly proportional with a height and width of one or more applications generated in a second illumination area.

The step 510 and the step 511 may involve enabling or disabling a portion of an illuminated area. The step 510 may involve disabling a portion of the first illumination area not included in the second illumination area. For example, when the first illumination area is larger than the second illumination area, the step 510 may be performed. The step 511 may involve enabling a portion of the second illumination area not included in the first illumination area. For example, when the first illumination area is smaller than the second illumination area, the step 511 may be performed. In another example, the step 510 and the step 511 may both be performed when the first illumination area and the second illumination area are in a different orientation, when a location of the first illumination area and the second illumination area area different, or a combination thereof. Disabling may be performed by, for example, transmitting one or more general purpose input/output (GPIO) flags to power on or off a chip or light. A GPIO flag may be a Boolean value indicating, for example, that a chip is powered on, a chip is powered off, a specific light on a chip, or any combination thereof. In an embodiment, the display adjustment application 104 may transmit one or more GPIO flags to one or more corresponding AAT3124 chips. The one or more GPIO flags may direct one or more fractional charge pump 300 (FIG. 3) to turn on or off one or more lights in order to change a first illumination area to a second illumination area.

The step 512 may involve displaying one or more images in a second illumination area. In an embodiment, one or more images in a second illumination area may be in a same position, rearranged, or hidden. For example, an application icon previously visible in a first illumination area may not be visible in second illumination area. In another example, an application icon may be moved to a new location on the display 110 or in relation to one or more other application icons. In an embodiment, one or more images in a second illumination area may be revealed by moving a location of a second illumination area. For example, a user may use a finger to scroll over one or more disabled areas to view one or more hidden applications. In another example, a user may user a finger to move a second illuminate area to a new location to reveal one or more hidden applications. In another embodiment, all images visible in a first illumination area may be visible in a second illumination area. For example, one or more application icons may be resized so that the one or more application icons may fit in a second illumination area. In another example, one or more running applications, such as, for example, a word processor, may be resized to fit within a second illumination area.

Figure 6:
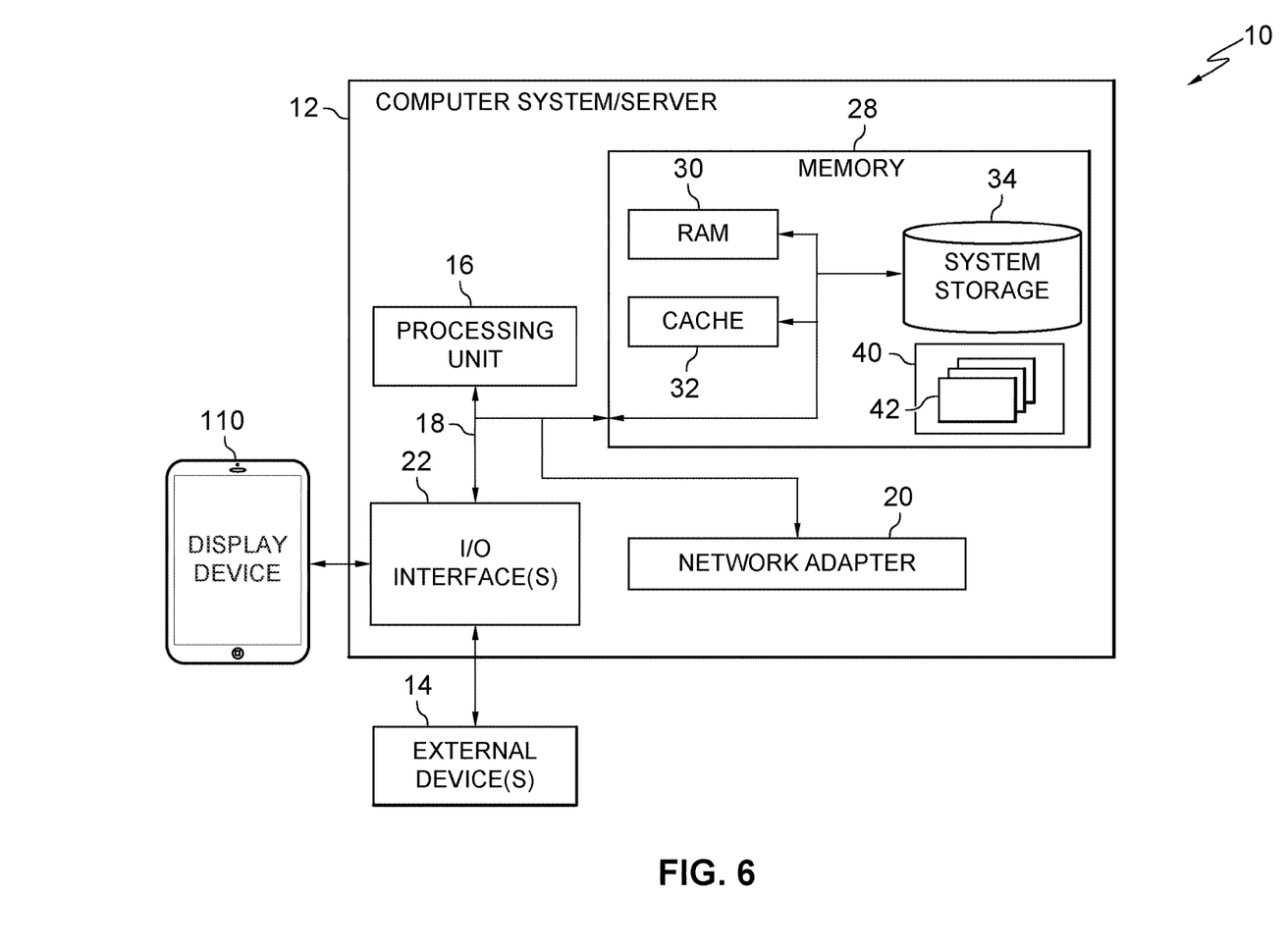
FIG. 6 depicts a block diagram of components of a proxy server computer executing the energy conserving program, in accordance with an embodiment of the present invention.

Referring now to FIG. 6, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, the display 110, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for reducing energy consumption by a display of a computing device, comprising:
   enabling a first illumination area of the display;
   receiving an input to adjust a second illumination area of the display, wherein adjusting comprises performing one or both of the following:
      disabling a portion of the first illumination area not included in the second illumination area; and
      enabling a portion of the second illumination area not included in the first illumination area;
   calculating an amount of energy storage available for the computing device based at least in part on one or more of:
      the disabled portion of the first illumination area; and
      the enabled portion of the second illumination area.

2. The method of claim 1, further comprising displaying an image on one or more of:
   the first illumination area on the display; and
   the second illumination area on the display.

3. The method of claim 1, wherein the display comprises:
   a first set of one or more light emitting diodes in the first illumination area; and
   a second set of one or more light emitting diodes in the second illumination area.

4. The method of claim 1, wherein disabling a portion of the first illumination area not included in the second illumination area comprises:
   a first illumination control chip disabling a first set of light emitting devices in at least the portion of the first illumination area not included in the second illumination area.

5. The method of claim 1, further comprising:
   scaling an image to fit the second illumination area, wherein prior to the scaling, the image is sized to fit the first illumination area.

6. The method of claim 1, wherein receiving the input to adjust the second illumination area comprises:
   receiving an input via a user input indicating a size of the second illumination area on the display.

7. The method of claim 1, wherein receiving the input to adjust the second illumination area comprises:
   receiving an input via a user input indicating a location of the second illumination area on the display.

8. The method of claim 1, wherein receiving the input to adjust the second illumination area comprises:
   receiving an input from a display adjustment application when energy storage drops below a threshold.

* * * * *